United States Patent
Hammer et al.

(10) Patent No.: US 6,363,431 B1
(45) Date of Patent: Mar. 26, 2002

(54) INTERNATIONAL SIGNALING GATEWAY

(75) Inventors: Kenneth Wayne Hammer, Lutz; Allen Amrollah Hemmat, Tampa, both of FL (US)

(73) Assignee: GTE Telecommunication Services Incorporated, Tampa, FL (US)

( * ) Notice: Subject to any disclaimer, the term of this patent is extended or adjusted under 35 U.S.C. 154(b) by 0 days.

(21) Appl. No.: 09/512,803

(22) Filed: Feb. 25, 2000

(51) Int. Cl.⁷ .............................................. G06F 15/16
(52) U.S. Cl. .................................... 709/249; 709/238
(58) Field of Search ................................ 709/249, 245, 709/246, 238, 242; 455/435, 426, 410, 445; 379/112, 230; 370/409, 351, 401, 9.1

(56) References Cited

U.S. PATENT DOCUMENTS

| | | | |
|---|---|---|---|
| 5,852,660 A | * 12/1998 | Lindquist et al. | 379/230 |
| 5,867,788 A | * 2/1999 | Joensuu | 455/445 |
| 5,953,653 A | * 9/1999 | Josenhans et al. | 455/410 |
| 6,094,578 A | * 7/2000 | Purcell et al. | 455/426 |
| 6,144,727 A | * 11/2000 | Mashinsky | 379/112 |
| 6,188,899 B1 | * 2/2001 | Chatterjee et al. | 455/435 |

* cited by examiner

Primary Examiner—Mehmet B. Geckil
(74) Attorney, Agent, or Firm—Leonard Charles Suchyta; James K. Weixel

(57) ABSTRACT

A system and method to transfer messages between signaling systems in different domains for wireless communication. In one aspect of the invention, a method for communicating between a switch servicing a roaming mobile phone in a domain different than a home switch to which the mobile phone is defined. A signaling gateway is used as an interface between the two domains. The method includes storing in the signaling gateway a mobile identification number (MIN) and the home switch point code that the mobile phone is defined to. When the mobile phone roams into another domain, the switch servicing the roaming mobile phone, the serve switch, identifies the mobile phone as belonging to another domain and sends a message to the signaling gateway. The signaling gateway stores this information and informs the home switch that all messages designated for the serve switch need to be sent to the signaling gateway. The signaling gateway may reformat the message prior to forwarding the message in the event the domains use different messaging protocols.

23 Claims, 4 Drawing Sheets

INTERNATIONAL SIGNALING GATEWAY

FIELD OF THE INVENTION

The present invention relates to sending messages between multiple devices in separate domains, and particularly, to using a signaling gateway to address the processing, reformatting, and routing of signaling messages between network domains and to resolve incompatibility issues at various network protocol layers.

BACKGROUND OF THE INVENTION

As mobile phone usage has increased, people have become more dependent on the ability to contact others using their mobile phone at any time, any place and anywhere. People use their mobile phones for business and pleasure and have adopted their use not just in a local city or town, but have become accustomed to using them while they are "roaming," i.e., outside of their local area. Telephone networks have become more adept at sending messages to other networks servicing these roaming mobile phones. National networks have been interlinked so that a person with a mobile phone can now travel all over the country and messages can be sent to the switch servicing the roaming mobile phone. These interlinked networks, however, are each contained within a domain. A domain is defined as a set of addressing and network element identifiers which is independent of other sets of identifiers or domains. An example is the set of ANSI SS7 addressing point codes. These point codes are addresses assigned to SS7 entities located within North America and are independent in format and identity from the addressing point codes used in other regions of the world having their own addressing domains.

A problem occurs when the mobile phone roams into a domain other than its home domain, because domains may use incompatible routing techniques, incompatible signaling protocols, or conflicting messaging parameters or identifiers. The software and equipment of different domains do not generally support direct point code addressing between domains. In addition to the point code addressing issues, there are many times various incompatibilities between device and network element identifiers in different domains, such as System Identification (SID) identifier.

SS7 networks have been in use internationally for signaling between wireline network entities. SS7 is a signaling protocol and is used for signaling functions such as establishing and disconnecting calls, and for enhanced telephony services, and with international gateways it has provided these functions for wireline carriers of different domains. Wireless international roaming is, however, new in some regions of the world and requires use of SS7 signaling for additional functions such as subscriber validation, fraud control, and call delivery to a roaming subscriber. Many wireless carriers utilizing AMPS, TDMA, and CDMA technologies use ANSI-41 messaging over SS7 networks for this purpose. SS7 networks used by wireless carriers in different domains need to get interconnected for exchange of ANSI-41 signaling messages between wireless switches. SS7 protocol however is in use in various variations. The version used in North America is based on the American National Standards Institute (ANSI) standard identified in this document as ANSI SS7. In most other countries, different but similar versions exist based on the International Telecommunication Union (ITU) standard and are known by ITU C7 or by similar names but some countries use ANSI formatted messages.

Signaling between networks of different countries introduces new challenges. With respect to SS7 networks a switch is identified by an address called a "point code." Within the North American domain, the ANSI standard for SS7 is used and the allocation of point codes has been coordinated so that each switch is identifiable by a unique point code. Yet, there has not been a coordination of point code allocation internationally. Outside North America, where the ITU version of SS7 is used, each country has its own domain of addresses independent of other countries. A specific ITU point code therefore could be in use in multiple domains. If these domains get interconnected without any modification, the same point code would identify multiple switches causing confusion when routing messages. Gateways are needed to perform point code translation between domains.

In addition to the issue of possible duplication of numbers, there is an inherent incompatibility between the ANSI and the ITU networks. An ANSI message is in a different format than an ITU message. Therefore, even if possible duplication of point codes was not a problem, an ANSI network could not be addressed by an ITU point code and vice versa.

The addressing problem has become even more complicated by arbitrary use of the point codes assigned to the North American domain (ANSI point codes) outside North America. Since in the past there has not been any wireless connectivity between countries, in some regions (e.g., in Far Eastern countries), SS7 ANSI point codes have been used for the ANSI-41 networks. This does not pose a problem as long as the North American networks are not connected to other domains. When connected, however, duplication of a North American point code in another country would create routing problems, because more than one switch could have the same point code assigned to it.

A different problem associated with the international connectivity of wireless switches is the limited number of point codes available to carriers. Although presently this may not be an issue, there is a potential for a lack of available point codes in the future. A wireless switch can be identified by more than one point code so that it could be accessed by multiple SS7 networks each having their own addressing domain of point codes. This makes the SS7 network of one domain accessible by another domain. This method, however, would drain the point code resources intended for a specific domain.

Standard organizations (e.g., ITU) have taken steps to solve the aforementioned issues by introducing various standards. The standards have not, however, been completely addressed, and also various countries have not implemented standards. To resolve the international signaling issues, equipment in all countries involved needs to be upgraded with the appropriate software. Partial upgrade of the SS7 nodes will not be of any benefit.

ITU Q.705 has defined international and national domains. The national domains use their own domestic signaling point codes and the international domains use an international signaling point code (ISPC). ITU Q.708 has defined the format of the ISPC, which includes zone and network identifiers. International gateways will translate the national point codes to the international point code and vice versa. The signaling messages are transported domestically to an international gateway using the initiating network local point code. The international signaling gateway in the originating country will translate the domestic point code to the ISPC and using the ISPC, route the messages to the international gateway in the destination country. The destination country international gateway translates the ISPC to the domestic point code of the destination country's domain and delivers the message to a SS7 node in the destination domestic domain. Translation of the domestic point codes to the ISPC and vice versa however requires a capability called Global Title Translation (GTT).

To use the GTT functions, certain standard details need to be defined or modifications to the existing standards need to be made. These include defining national Translator Type (TT) parameters and enhancements to the IS-41 messaging standard. These standards efforts are not fully resolved and what is resolved has not been implemented by the network providers. IS-41 Revisions A, B, and C, do not define the GTT capability for all messaging needed for international signaling. IS-807 standard has defined this capability but requires the roaming partners to implement the standard. Simultaneous upgrade of the equipment software of all parties involved is required for these standards to be beneficial. Therefore, the conflict between various point code domains is still an unresolved issue for international signaling and in particular for wireless device international roaming. This invention provides interoperability between wireless switches that are IS807 complaint and those which are not. It also provides interoperability between different versions of SS7 that are not compatible, such as ANSI SS7 and ITU C7 or incompatible implementations of ITU C7.

Another challenge of international connectivity of wireless switches is maintaining point codes of the switches where each roaming mobile phone is visiting. Tables are maintained at the roaming mobile phone's visiting and home switches. The visiting switch table includes the point codes of the home switches of roaming subscribers. When a roamer enters a visiting market, the visiting switch sends appropriate messages to the home switch of that particular subscriber to register and validate the subscriber.

Within a domain, the number of wireless switches that a carrier has a roaming agreement with is limited. With connectivity to many domains for international roaming, however, the size of the table in switches becomes very large. This will cause two problems. First, the size of the switch data base becomes prohibitive. Presently, even in domestic roaming, there are cases where, due to insufficient switch capacity, information once entered in a switch database for roaming subscribers gets deleted by the switch operators when they see that roaming has not taken place for a while. Roaming mobile phone subscribers will be denied service when this happens.

Second, the table maintenance task at the switch becomes time-consuming. If the point code for a certain switch is changed or eliminated due to the fact that the switch is not going to be in service any more, or when a new switch is added, all switches of the roaming partners should reflect this change in their associated databases. This becomes a difficult and expensive task as the international connectivity to various domains increases.

In addition to the point code conflict issues, there are a number of different network element and device identifiers that could exist in duplication or with incompatible formats in various domains. An example of this is the SID. In the absence of an international coordinating entity, SIDs originally were assigned to different countries by a US based entity. These assignments, however, have not been followed by all countries and the SIDs assigned to one domain have been at times used in another domain.

Therefore, what is needed in the art is a system and method for coordinating all the point codes between multiple domains that does not increase switch overhead or demand a significant increase of maintenance in the switch. Having a centralized data base of addresses would eliminate the need for maintaining this information at multiple locations within separate domains.

SUMMARY OF THE INVENTION

Methods, systems and articles of manufacture consistent with the present invention overcome the shortcomings of existing systems for sending signaling messages between domains using an interface between domains to store point codes of various switches in the domains to modify message formats so that they are compatible within each domain, and to provide interoperability between incompatible network parameters such as switch ID and device numbering plans.

In accordance with one aspect of the present invention, as embodied and broadly described herein, a method in a data processing system comprises the steps of storing an address of a first device and associated routing information, receiving a message from a second device in a first format, identifying routing information contained in the message, retrieving the address of the first device associated with the routing information, and sending the message to the address of the first device. The first device may be in a home domain and the second device may be in a serve domain. However, the first device may be in a serve domain and the second device may be in a home domain. In addition, the message in a first format may be incompatible with the first device and then the step of sending the message to the address comprises the steps of reformatting the message in a second format compatible with the first device and sending the reformatted message to the address of the first device.

In accordance with one aspect of the present invention, as embodied and broadly described herein, a method in a data processing system comprises the steps of associating a Mobile Identification Number (MIN) with an address of a first switch in a first domain, receiving a message from a second switch, wherein the message is in a first format, identifying the MIN contained within the message, retrieving the address of the first switch using the MIN contained in the message, and sending the message to the first switch having the address. In addition, the step of sending the message to the first switch may comprise reformatting the message in a second format and sending the reformatted message to the first switch having the retrieved address. Reformatting might include replacing network element identifiers such as SID to eliminate identifier conflicts between domains, and resolving other conflict and interoperability issues between various domains.

In accordance with one aspect of the present invention, as embodied and broadly described herein, a gateway for transmitting messages between a first device and a second device comprises a database containing a Mobile Identification Number (MIN) and an associated point code, databases containing network element identifiers and their associated domains, a protocol processing unit capable of associating the address assigned to the gateway in the domain of the first device with the address assigned to the gateway in the domain of the second device, and a processor operative to perform the following steps of receiving the message in one format from the first device, identifying the MIN contained in the message, retrieving the point code associated with the MIN in the database, reformatting the message to resolve conflict and interoperability issues, and sending the reformatted message to the second device having the associated point code. The first device and the second device may be associated with separate domains.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the drawings.

DETAILED DESCRIPTION OF THE PREFERRED EMBODIMENT

Figure 1:
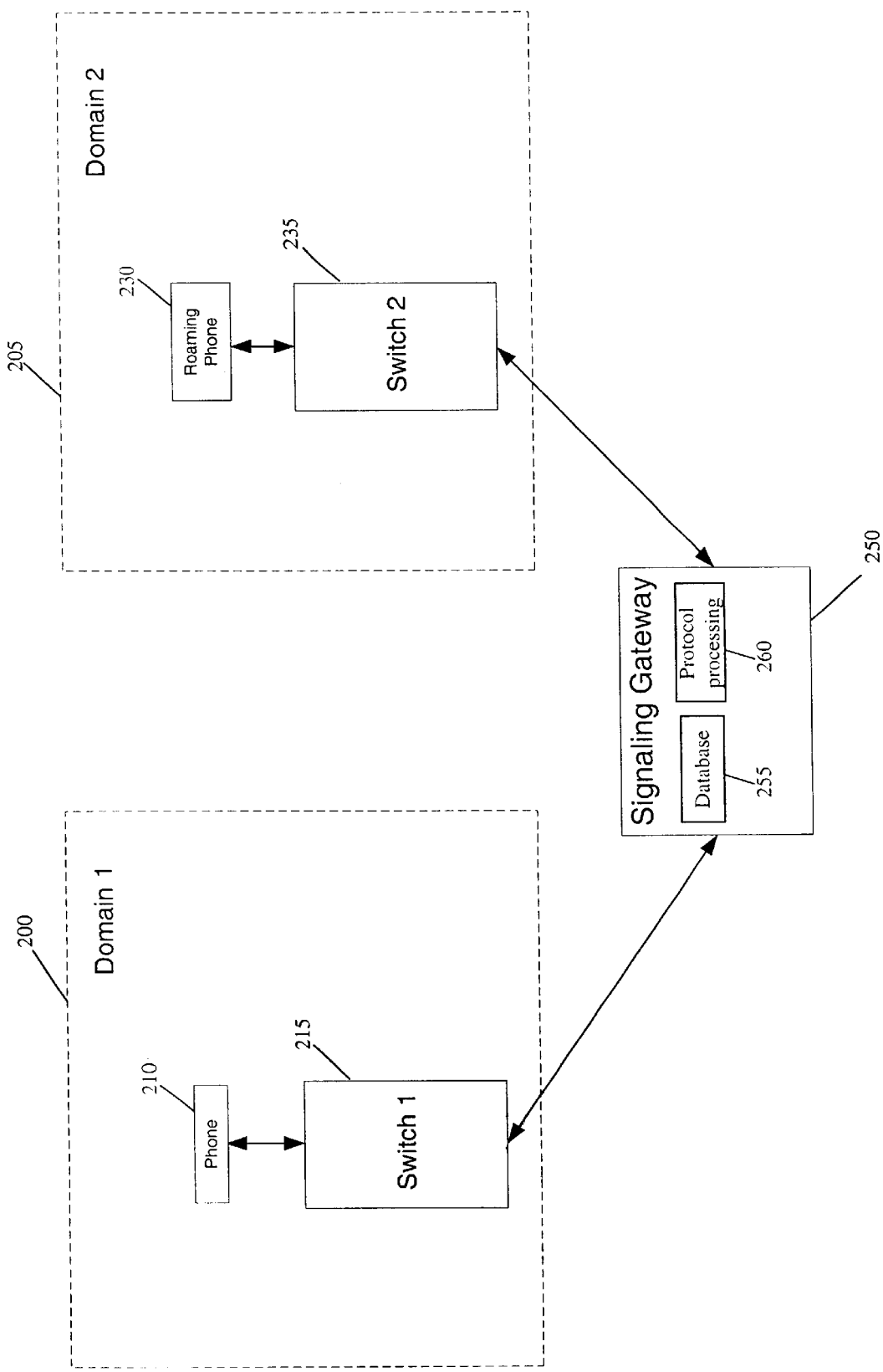
FIG. 1 depicts the use of a signaling gateway to communicate between domains in an exemplary embodiment of the present invention.

Reference will now be made in detail to the presently preferred embodiments of the invention as illustrated in the accompanying drawings, in which like reference characters designate like or corresponding parts throughout the several drawings.

Introduction

Systems and methods consistent with the present invention use an interface to transfer messages between domains allowing communication between systems within the domains, especially for roaming devices. The interface maintains a database containing information related to the roaming device, network and device identifiers, and addresses within each domain to transfer the information. In addition, the interface contains a protocol processing section so that in the event the two domains use different protocols, the interface can modify the message format accordingly.

In more detail, a roaming device is defined to a home network element, a switch in this example, in a home domain. When the roaming device enters a second domain, the serve network element, a switch in this example, in the second domain recognizes that the roaming device is from another domain. A message is sent to an interface, or in one embodiment, an international signaling gateway, identifying the roaming device and the serve switch that is servicing the roaming device.

The interface stores this information within a database and sends a message to the home switch. The home switch updates its database to indicate that the device is roaming and that any messages to be sent to the switch servicing the roaming device are to be sent to the interface.

To send a message from the serve switch to the home switch, the serve switch sends the message to the interface. The interface identifies the home switch, reformats the message in the case where the protocol of the serve switch is different than the protocol of the home switch, resolves any switch network element or device identifier conflicts by replacing an identifier belonging to one domain with one belonging to another domain, and sends the message, or reformatted message, to the home switch.

To send a message from the home switch to the serve switch, the home switch sends the message to the interface. The interface identifies the serve switch servicing the roaming device associated with the message. The interface reformats the message, if necessary, resolves conflicts, and sends the message, or reformatted message, to the serve switch.

A signaling gateway could be connected to one or more signaling gateways, in which case it would route the messages to the appropriate gateway which in turn routes it to the destined domain. Consequently, systems and methods consistent with the present invention simplify the communication between devices or network elements in the domains by having one device address the second device as if it was in the same domain, whether or not multiple signaling gateways are used or whether or not the separate domains use incompatible addressing formats, protocols or services.

FIG. 1 depicts the use of a signaling gateway to communicate between two domains in a manner consistent with an exemplary embodiment of the present invention. In one embodiment, Domain 1 200 contains a switching system, represented by switch 1 215 having a phone 210 serviced by switching system 1 215. It will be recognized by one skilled in the art that even though only one switch and one phone is depicted, Domain 1 may contain many interconnected network elements such as Home Location Register (HLR), Service Control Point (SCP), Messaging Centers or Intelligent Network (IN) nodes and switches, each servicing multiple devices including landline phones, mobile phones, computers and other devices that require the use of a network to communicate to another device. In addition, Domain 1 200 may contain multiple networks interconnected, each having their own network node and switching system. In one embodiment, switches contained in Domain 1 communicate with each other using the same messaging format, i.e., ANSI SS7, ITU C7, or similar protocols and utilize device and network identifiers which are unique within that domain.

Switch 1 215 will also contain an address to the signaling gateway so that it can send messages to a switch in Domain 2 205. Switches desiring to communicate with another domain only need access to the signaling gateway; i.e., the destination switch point code and device or network identifiers do not need to be known by the source switch. Domain 2 205 also contains a switching system represented by switch 2 235 servicing a roaming phone 230. Similar as with Domain 1, Domain 2 may contain multiple interconnected network element and switching systems each having multiple devices connected to them. In addition, it will be recognized that although one switch is depicted in FIG. 1, multiple switches or network nodes in a switching system may contain the address to the signaling gateway, should those systems desire to send messages outside of Domain 2 205. Furthermore, even though only one signaling gateway is depicted in FIG. 1, it will be recognized by one skilled in the art that multiple signaling gateways may be interconnected, each one possibly having one or more domains associated with it, and supporting the processing, reformating and routing of messages between the multiple domains.

In one embodiment of the present invention, the roaming devices are defined to a home switch in Domain 1 200. A home switch refers to the switch that the roaming device is defined to prior to roaming. Other devices may be connected to the switch 215 in Domain 1 and in fact may be roaming internally within Domain 1 200, i.e., being serviced by a switch other than their home switch. Switches servicing devices that are roaming internally within a Domain do not need to access the signaling gateway to send messages between each other, because all the switches contained in a domain will typically use the same message format and will use compatible routing techniques and network element identifiers (i.e., switch addresses, SID, etc.).

Switch 2 235 will also contain an address to the signaling gateway. All messages that are destined for switches outside of Domain 2, Switch 2 235 will send to the signaling gateway for processing. It is preferable that any switch or network entity desiring to service roaming devices defined to a home switch in another domain contain an address to the signaling gateway.

The international signaling gateway 250 is an interface between domains 200 and 205, to facilitate the transfer of messages between network elements in the separate domains. The international signaling gateway 250 contains a database component 255 and a protocol processing component 260. The database component is used to maintain a listing of device identification numbers of the devices and their defined home switch. For example, a mobile phone will have a MIN associated with it and will be defined to a specific home switch in a specific domain.

In addition, the database will maintain the domain and address information of another network entity, e.g., the point code of the roaming switch, which may be the serve switch that is servicing a roaming mobile phone in a different domain from the roaming mobile phone's home switch. In one embodiment, the database will also associate the serve switch along with the MIN of the roaming mobile phone the serve switch is servicing. Therefore, for a mobile phone roaming in a domain different than its home domain, the database component will contain and correlate a MIN for the mobile phone, the home switch the mobile phone is defined to, the serve switch currently servicing the mobile phone, and all other device and network identifiers associated with the phone and with the home and visiting domain network elements. It will be recognized by one skilled in the art that the database component may be implemented in many ways, such as the use of relational databases, multiple tables or files using various retrieval algorithms.

The signaling gateway 250 also includes a protocol processing component 260 to facilitate the interface between domains that use different messaging formats. As discussed above, a domain will typically use an ANSI-SS7, an ITU C7 or a similar ITU based protocol to format its message. However, when transferring messages between different domains, the signaling gateway may encounter two domains that use different protocols. In the instance where the signaling gateway must send a message received from one domain with one message format to another domain in another format, the signaling gateway protocol processing component 260 will reformat the message so that the message is in the correct format for the domain receiving the message. It will also replace the identifier belonging to one domain with an identifier belonging to another Domain.

It will be recognized by one skilled in the art that while FIG. 1 depicts the signaling gateway interfacing between two domains to facilitate the passing of messages between switches, that systems and methods consistent with the present invention may also include additional domains with varying protocols and signaling gateways and may facilitate the passing of messages between other network elements within those domains, including those network elements required to route information. It will be recognized that the present invention may be used to address incompatibility at multiple protocol layers and services. Furthermore, FIG. 1 is described with respect to switches, however it will be recognized by one skilled in the art that other systems involved in the processing of routing and/or signaling messages may be used.

Figure 2:
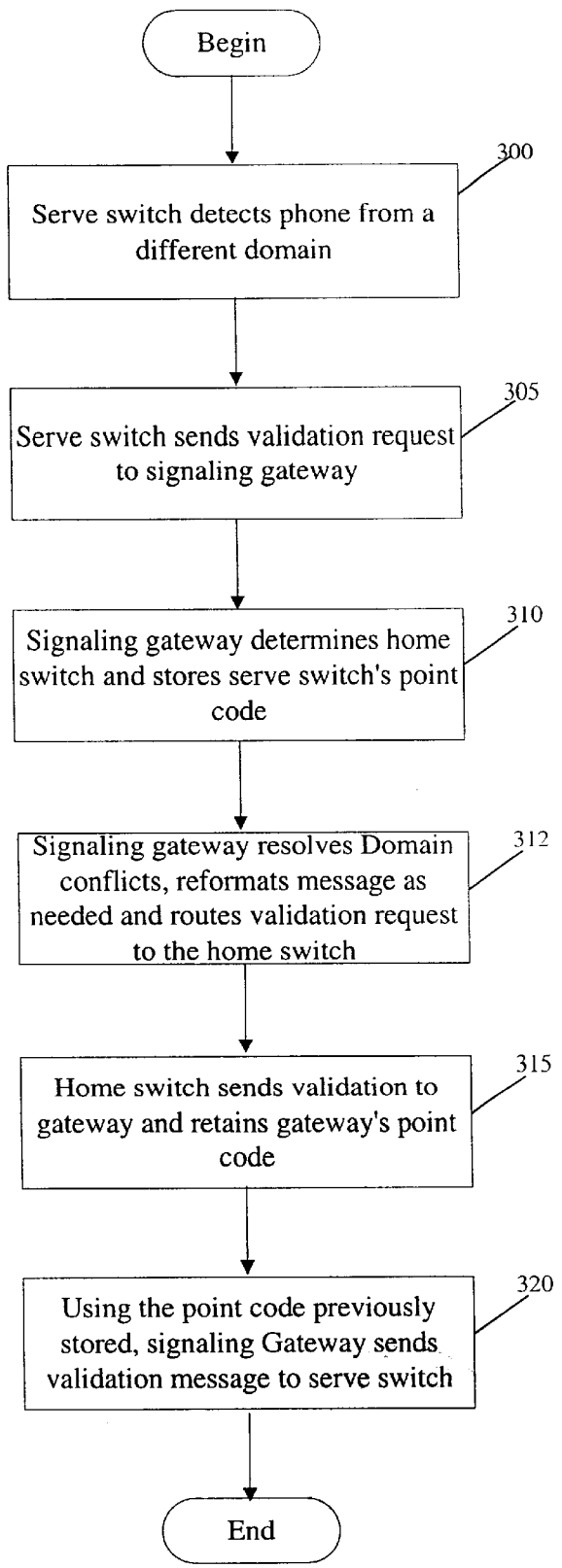
FIG. 2 is a flow chart establishing the serve switch point code in a signaling gateway during a roaming validation process in a manner consistent with an exemplary embodiment of the present invention.

FIG. 2 is a flow chart showing the steps involved in establishing the serve switch point code in the signaling gateway during the roaming validation process in a manner consistent with the exemplary embodiment of the present invention. In one embodiment, the signaling gateway determines serve switch point codes and correlates them to a mobile phone using a validation process. Prior to a phone roaming in to a new domain, the signaling gateway will associate the mobile phone to its defined home switch. However, when the mobile phone roams, the home switch no longer services that "roaming mobile phone" and, provided the mobile phone is capable of being serviced in the roaming area, a different switch will be designated as servicing that roaming phone. In most networks, when a new phone enters a market that is not its home market, the switch servicing that phone will try to validate that phone to confirm that the phone belongs to another switch and will also try to receive other administrative information, such as user profile information. In this embodiment, when a roaming phone enters a domain different than its home domain, the serve switch will recognize the roaming phone and send messages destined for the home switch to the signaling gateway even though the serve switch may not know which domain the roaming phone belongs to or the point code of home switch.

Establishing the serve switch point code begins when the serve switch detects the phone from a different domain (Step 300). When the phone enters the serve switch's domain, it sends a message to the serve switch identifying itself. The serve switch will recognize that not only is the phone defined to another switch, but that the phone is from another domain. When the phone sends this message, the serve switch begins the process to validate that roaming phone by first sending a validation request to the signaling gateway (Step 305). Again, this validation request is sent to the signaling gateway because it is recognized that this phone belongs to a separate domain. In this embodiment, if this phone was roaming within the same domain, i.e., the home switch is within the same domain as the serve switch, the serve switch would not send the message to the signaling gateway but would send it directly to the home switch within the same domain.

The signaling gateway receives the message, or validation request, and determines the home switch and stores the serve switch's point code and device network identifiers within the signaling gateway's database (Step 310). Within the signaling gateway database, an identification associated with each phone and its corresponding home switch is maintained in the database. This identification number, such as a mobile identification number (MIN), is used to uniquely identify a phone. When the serve switch sends the validation request to the signaling gateway, the message includes the MIN of the roaming phone, source and destination point codes. Here, the source point code is the address of the switch that sent the message, i.e., the serve switch, and the destination point code is the address of the SS7 entity where the message is intended to go, i.e., the signaling gateway.

When a phone is roaming within a domain, the destination switch point code will be the address of the home switch defined to the phone. However, when the mobile phone is roaming outside its home domain, the destination point code will be the address of the signaling gateway. This is because the serve switch cannot identify the home switch in a separate domain. The signaling gateway retrieves the serve switch point code from the validation request.

The signaling gateway now has access to the MIN of the phone and its associated serve switch point code, received from the validation request, and the home switch point code associated with the MIN, already stored in its database. Looking up the home switch point code associated with the MIN that was contained in the validation request, the signaling gateway then sends the validation request to the home switch.

Next the signaling gateway resolves domain conflicts, reformats the message, if required, and routes a validation request to the home switch (Step 312).

If the mobile phone is valid, the home switch then sends the validation to the signaling gateway and utilizes the signaling gateway's point code to forward messages to the serve switch (Step 315). Similarly, as with the message sent from the serve switch to the signaling gateway, the message from the signaling gateway to the home switch also contains a source point code and a destination point code. However in this instance, the signaling gateway's address is the source point code and the destination point field is the home switch address. The home switch updates its database to identify the roaming phone, or its MIN, and that messages for the serve switch servicing that roaming phone should be sent to the point code indicated in the source switch point code field of the validation request sent by the signaling gateway, i.e., the signaling gateway's point code.

Using the serve switch point code previously stored, the signaling gateway then sends the validation message received from the home switch to the serve switch (Step 320). The validation process then ends. The end result of this process is that the home switch now has an updated point code to send messages for the serve switch servicing the roaming phone, which is the signaling gateway. The signaling gateway has the point code of the serve switch where the roaming phone is now being serviced and the home switch defined to the roaming phone. And, the serve switch has already established that the roaming phone belongs to a separate domain, and, therefore, all messages destined for the roaming phone's home switch need to be sent to the signaling gateway. The gateway will act as the interface between domains, maintaining all the correlations of the various switches that a specific roaming phone is associated with, namely its home switch and current serve switch.

It will be recognized by those skilled in the art that while point codes were used in the description with respect to FIG. 2, the present invention may be used to resolve other address information and services issues, at multiple protocol levels, between two domains. In addition, it will be recognized by those skilled in the art that messages other than validation requests and messages may be sent between the serve switch, the home switch, and the signaling gateway.

Figure 3:
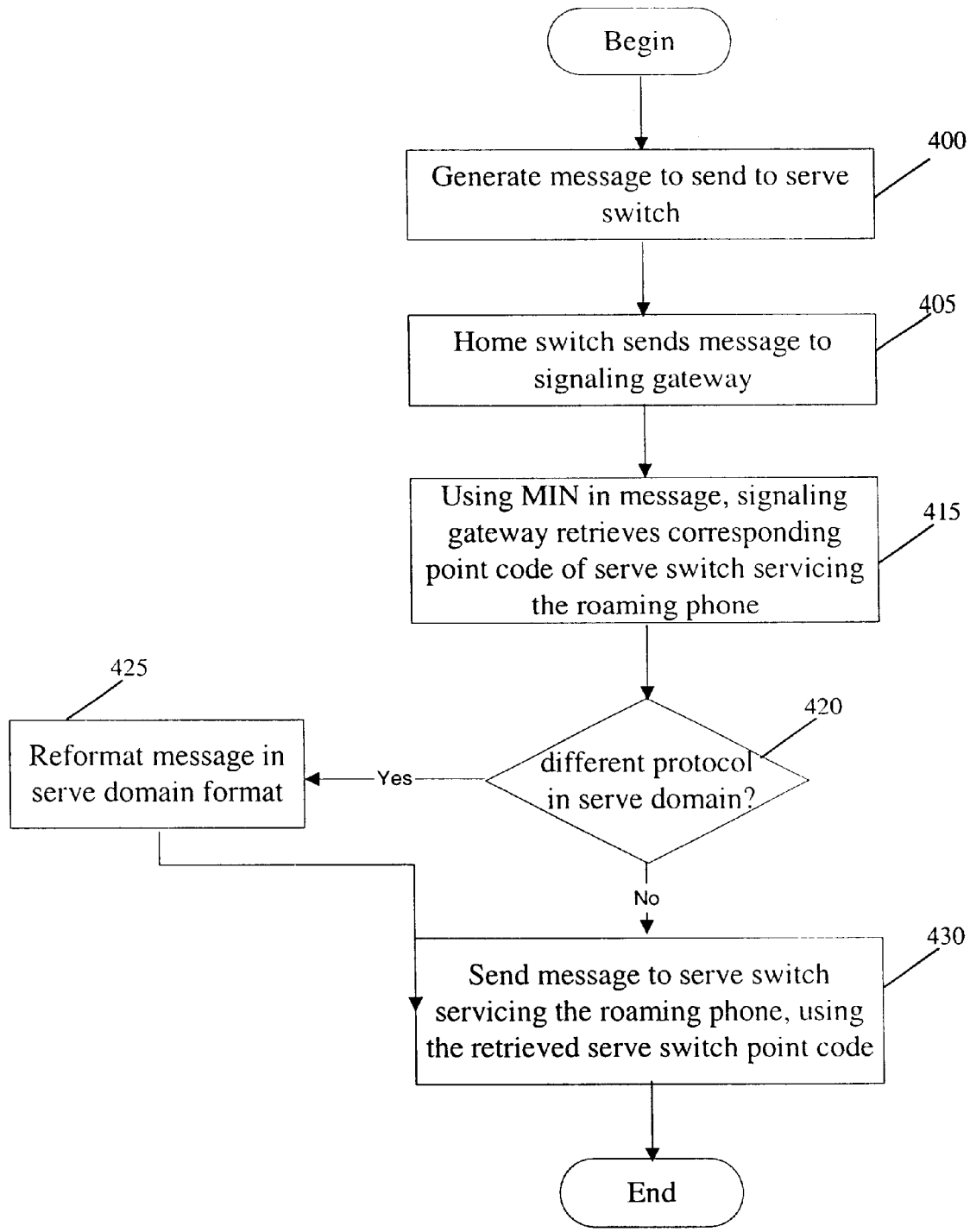
FIG. 3 depicts the process of a home switch sending a message to a serve switch using a signaling gateway in a manner consistent with an exemplary embodiment of the present invention.

FIG. 3 depicts the process of a home network element, in this example a switch, sending a message to a serve network element, in this example a switch, using a signaling gateway in a manner consistent with an exemplary embodiment of the present invention. This process begins by the home switch generating a message to send to the serve switch (Step 400). Messages can be exchanged between the home and serve switches for various purposes, including roaming phone authentication, authorization, and short message deliveries.

After generating the message, the home switch then sends the message to the signaling gateway (Step 405). After receiving this message, the signaling gateway uses the MIN in the message and retrieves the corresponding point code of the serve switch servicing the roaming phone (Step 415). The serve switch point code associated with the MIN is contained in a database accessible by the signaling gateway. After determining the point code of the serve switch, the signaling gateway then determines whether the message formats and identifiers are compatible between the two domains. For example, some domains use an ANSI SS7 message format whereas other domains us an ITU C7 format; some use a version of ITU which is incompatible with the ITU format used in another domain. It will be recognized by those skilled in the art that many types of protocol formats may be used by various domains. The signaling gateway determines whether the format of the message from the home switch is different from the format used by the serve switch servicing the roaming phone (Step 420). There could also be a duplication of switch or device identifiers between domains. The signaling gateway replaces the identifier belonging to one domain with an identifier recognizable and unique to another domain.

In the event that the message formats between the two domains are different, the signaling gateway follows the "Yes" branch and reformats the message in the serve domain format (Step 425). The signaling gateway then proceeds to send the reformatted message to the serve switch using the retrieved serve switch point code (Step 430).

If there is no change in message formats or contents in Step 420, the signaling gateway then proceeds to send the message sent to it by the home switch to the serve switch servicing the roaming phone using the retrieved serve switch point code (Step 430).

Figure 4:
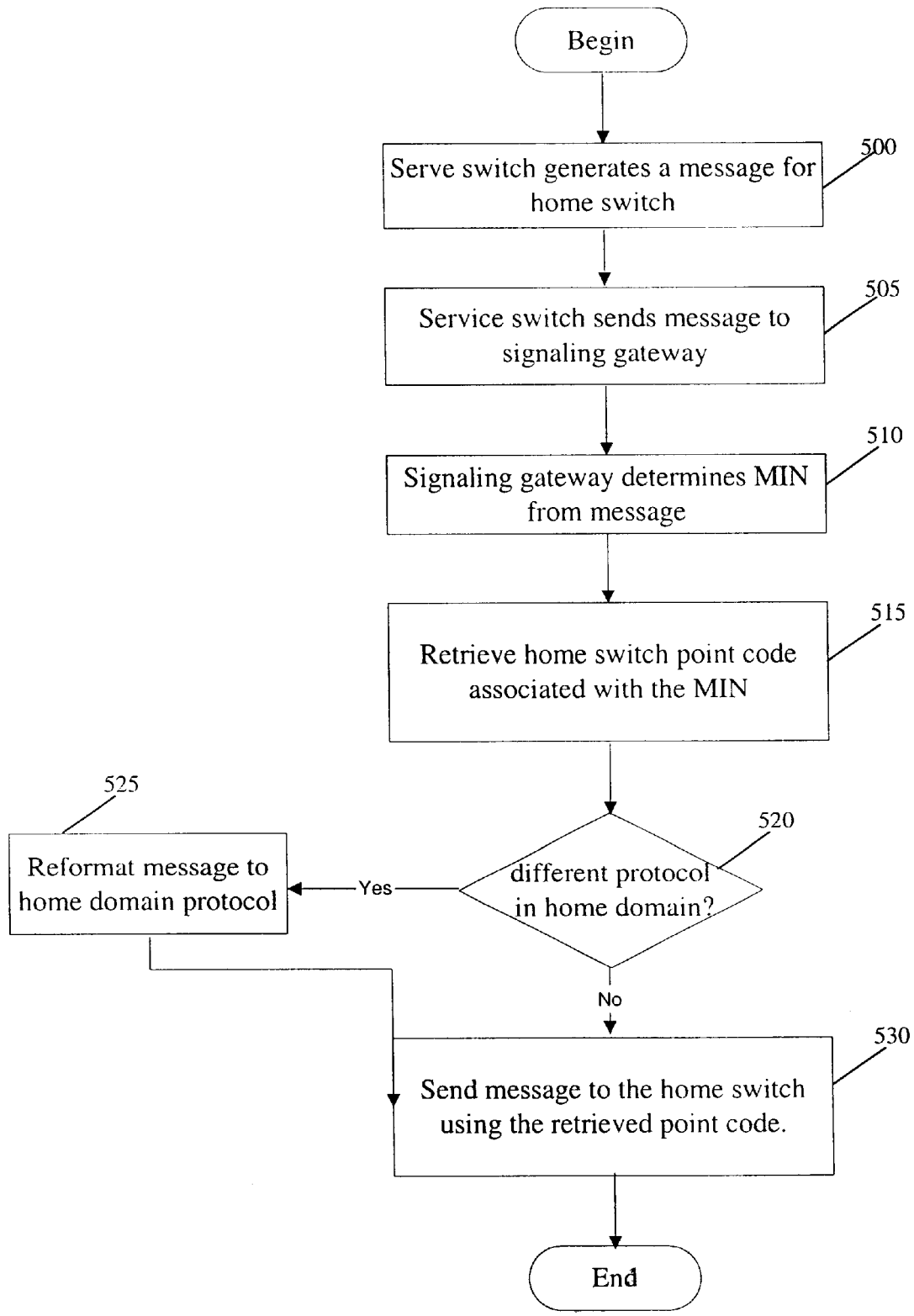
FIG. 4 depicts the process of a serve switch sending a message to a home switch using a signaling gateway in a manner consistent with an exemplary embodiment of the present invention.

FIG. 4 depicts the process of a serve switch sending a message to a home switch using a signaling gateway in an exemplary embodiment of the present invention. This process begins by the serve switch generating a message for the home switch (Step 500). The serve switch recognizes that the roaming phone's home switch is in a separate domain. Therefore the serve switch will direct any messages for this roaming phone's home switch to the signaling gateway.

After generating the message, the serve switch sends this message to the signaling gateway (Step 505). When the signaling gateway receives the message, the signaling gateway then looks into the message and retrieves the MIN contained in the message (Step 510). As stated earlier, the message typically will contain the MIN of the roaming phone, a source switch point code and a destination point code. Similarly as with receiving a message from the home switch, the signaling gateway then uses this MIN to retrieve the point code of the home switch associated with the MIN, which is stored in a database accessible by the signaling gateway (Step 515). In one embodiment, the signaling gateway keeps a database of all the roaming phones' MINs that will be serviced by the signaling gateway and their defined home switch point codes.

The signaling gateway then determines whether the domains have different protocols or conflicting identifiers thereby requiring different message formats and identifiers (Step 520). In the event that the separate domains do use different protocols or conflicting identifiers, the "Yes" branch is followed and the signaling gateway reformats the serve switch generated message into a format and content that is compatible with the home domain (Step 525). After reformatting the message, the reformatted message is sent to the home switch point code retrieved from the database (Step 530).

If in Step 520 the protocols in the home and serve domains are not different and there is no identifier conflicts, then the "No" branch is followed and the message is sent to the home switch using the retrieved point code (Step 530).

Conclusion

Systems and methods to transmit messages between wireless systems in different domains in a manner consistent with the present invention facilitate the coordination of point codes and network identifiers among multiple domains and reduce the maintenance overhead required by the individual systems within the domains. By providing an interface, or a signaling gateway in one embodiment, between the domains, the serve switch point code currently servicing a roaming mobile device can be tracked and correlated with the home switch point code defined to the mobile device in a separate domain. When the serve switch desires to send a message to the home switch, the message is sent to the interface, the signaling gateway, and the interface determines the destination home switch. Likewise, when the home switch needs to send a message to the serve switch, the home switch sends the message to the interface and the interface routes the message to the serve switch. The interface can also reformat the message in the event the home switch and serve switch use different protocols for their messaging, or replace a network element or device identifier belonging to one domain with another one belonging to the other domain.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but one embodiment of the present invention may be implemented as a combination of hardware and software or in hardware alone. The invention may be implemented with both object-oriented and non-object-oriented programming systems. Additionally, although aspects of the present invention are described as being stored in memory, those skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method in a data processing system comprising the steps of:
   storing an address of a first device and associated routing information;
   receiving a message from a second device in a first format;
   storing an address of the second device and associated routing information;
   identifying routing information contained in the message;
   retrieving the address of the first device associated with the routing information identified in the message; and
   sending the message to the address of the first device, wherein the first device may be unaware of the address associated with the second device and the second device may be unaware of the address associated with the first device.

2. The method of claim 1, wherein the first device is in a home domain and the second device is in a serve domain.

3. The method of claim 1, wherein the first device is in a serve domain and the second device is in a home domain.

4. The method of claim 1, wherein the message in a first format is incompatible with the first device and the step of sending the message to the address comprises the steps of:
   reformatting message in a second format compatible with the first device; and
   sending the reformatted message to the address of the first device.

5. The method of claim 4, wherein the first format is an ANSI SS7 format and the second format is in an ITU format.

6. The method of claim 4, wherein the first format is an ITU format and the second format is in an ANSI SS7 format.

7. A method in a data processing system comprising the steps of:
   associating a Mobile Identification Number (MIN) with an address of a first switch in a first domain;
   receiving a message from a second switch, wherein the message is in a first format;
   identifying the MIN contained within the message;
   retrieving the address of the first switch using the MIN contained in the message; and
   sending the message to the first switch having the address, wherein the first switch may be unaware of the address associated with the second switch and the second switch may be unaware of the address associated with the first switch.

8. The method of claim 7, wherein the step of sending the message to the first switch comprises:
   reformatting the message in a second format; and
   sending the reformatted message to the first switch having the retrieved address.

9. The method of claim 7, wherein the second device is in a second domain.

10. The method of claim 9, wherein the first domain is a serve domain and the second domain is a home domain.

11. The method of claim 9, wherein the first domain is a home domain and the second domain is a serve domain.

12. The method of claim 8, wherein the first format is an ANSI SS7 format and the second format is an ITU format.

13. The method of claim 8, wherein the first format is an ITU format and the second format is an ANSI SS7 format.

14. A gateway for transmitting messages between a first device and a second device, comprising:
   a database containing a Mobile Identification Number (MIN) and an associated point code;
   a protocol processing unit capable of reformatting a message received in a first format to a second format; and
   a processor operative to perform the following steps of:
      receiving the message in the first format from the first device,
      identifying the MIN contained in the message,
      retrieving the point code associated with the MIN in the database,
      reformatting the message in a second format, and
      sending the reformatted message to the second device having the associated point code.

15. The gateway of claim 14, wherein the first device and the second device are located in separate domains.

16. The gateway of claim 15, wherein the first device is a serve switch, and the second device is home switch, and the point code is an address of the second device.

17. The gateway of claim 15, wherein the first device is a home switch, and the second device is a serve switch, and the point code is an address of the second device.

18. A method for sending a message between a home domain switch and a serve domain switch, using an interface, comprising:
   storing a home domain switch point code associated with a Mobile Identification Number (MIN);

receiving a message containing the MIN and a serve domain switch point code from the serve domain switch;

identifying the MIN in the message;

retrieving the home domain switch point code associated with the MIN;

storing the serve domain switch point code and associating the serve domain switch point code with the MIN; and sending the message to the home domain switch point code, wherein the home domain switch may be unaware of the point code associated with the serve domain switch and the serve domain switch may be unaware of the point code associated with the home domain switch.

19. The method of claim 18, further comprising the steps of:

receiving a second message from the home domain switch for the serve domain switch;

retrieving the stored serve domain switch point code associated with the MIN contained in the second message; and sending the message to the serve domain switch point code.

20. The method of claim 19, wherein the step of sending the message to the serve domain comprises the steps of:

reformatting the message in a format compatible with the server domain switch; and sending the reformatted message to the serve domain switch point code.

21. The method of claim 18, wherein the step of sending the message to the home domain switch point code comprises the steps of:

reformatting the message in a format compatible with the home domain switch; and sending the reformatted message to the home domain switch point code.

22. A method in a data processing system comprising means for storing an address of a first device and associated routing information;

means for receiving a message from a second device in a first format;

means for storing an address of the second device and associated routing information;

means for identifying routing information contained in the message;

means for retrieving the address of the first device associated with the routing information identified in the message; and means for sending the message to the address of the first device, wherein the first device may be unaware of the address associated with the second device and the second device may be unaware of the address associated with the first device.

23. The method of claim 22, wherein the message in a first format is incompatible with the first device and the step of sending the message to the address comprises the steps of:

means for reformatting the message in a second format compatible with the first device; and means for sending the reformatted message to the address of the first device.

\* \* \* \* \*